(12) United States Patent
Lohr

(10) Patent No.: US 7,295,594 B1
(45) Date of Patent: Nov. 13, 2007

(54) DEVICE FOR LOW-INTERFERNCE SIGNAL TRANSMISSION

(75) Inventor: Georg Lohr, Eichenau (DE)

(73) Assignee: Schleifring und Apparatebau GmbH, Fuerstenfeldbruck (DE)

( * ) Notice: Subject to any disclaimer, the term of this patent is extended or adjusted under 35 U.S.C. 154(b) by 0 days.

(21) Appl. No.: 09/581,007

(22) PCT Filed: Dec. 31, 1998

(86) PCT No.: PCT/DE98/03811

§ 371 (c)(1),
(2), (4) Date: Jul. 24, 2000

(87) PCT Pub. No.: WO99/35769

PCT Pub. Date: Jul. 15, 1999

(30) Foreign Application Priority Data

Dec. 31, 1997 (DE) ................ 197 58 256

(51) Int. Cl.
*H04B 1/69* (2006.01)
*H04B 1/707* (2006.01)

(52) U.S. Cl. ............ 375/130; 375/295; 375/256; 455/71

(58) Field of Classification Search ........... 375/130, 375/132, 133, 270, 269, 302, 313, 224, 285, 375/346, 347, 349, 340, 131, 348, 295, 256; 340/825, 825.01, 825.02; 455/67.1, 284, 455/313, 316, 71

See application file for complete search history.

(56) References Cited

U.S. PATENT DOCUMENTS

| | | | | |
|---|---|---|---|---|
| 4,831,463 A | * | 5/1989 | Faroudja | 386/27 |
| 5,283,780 A | * | 2/1994 | Schuchman et al. | 370/312 |
| 5,903,555 A | * | 5/1999 | Wildauer et al. | 370/342 |
| 5,995,534 A | * | 11/1999 | Fullerton et al. | 375/146 |
| 6,075,817 A | * | 6/2000 | Gruenberg | 375/240 |
| 6,240,126 B1 | * | 5/2001 | Ohashi et al. | 375/132 |
| 6,243,587 B1 | * | 6/2001 | Dent et al. | 455/456.2 |
| 6,335,953 B1 | * | 1/2002 | Sanderford et al. | 375/344 |
| 6,611,548 B2 | * | 8/2003 | Lomp | 375/148 |
| 6,748,022 B1 | * | 6/2004 | Walker | 375/289 |
| 7,200,367 B1 | * | 4/2007 | Wright et al. | 455/91 |

FOREIGN PATENT DOCUMENTS

EP 0 163 313 A2 12/1985
EP 0 505 771 A1 9/1992

* cited by examiner

*Primary Examiner*—Mohammed Ghayour
*Assistant Examiner*—Qutub Ghulamali
(74) *Attorney, Agent, or Firm*—Kevin L. Daffer; Daffer McDaniel, LLP

(57) ABSTRACT

Digital signal transmitter devices mostly present a distinct wide-band interference spectrum which renders compliance with the presently applicable EMC standards substantially more difficult.

Available provisions for improving the EMC characteristics take an influence on the quality in transmission and on the immunity to interference.

By the inventive method the carrier signal or output signal, respectively, of the transmitter is so modulated that the narrow spectral lines are spread and the spectral power density is reduced.

44 Claims, 14 Drawing Sheets

FIG 4 Tek Run: 10.0GS/s ET Sample
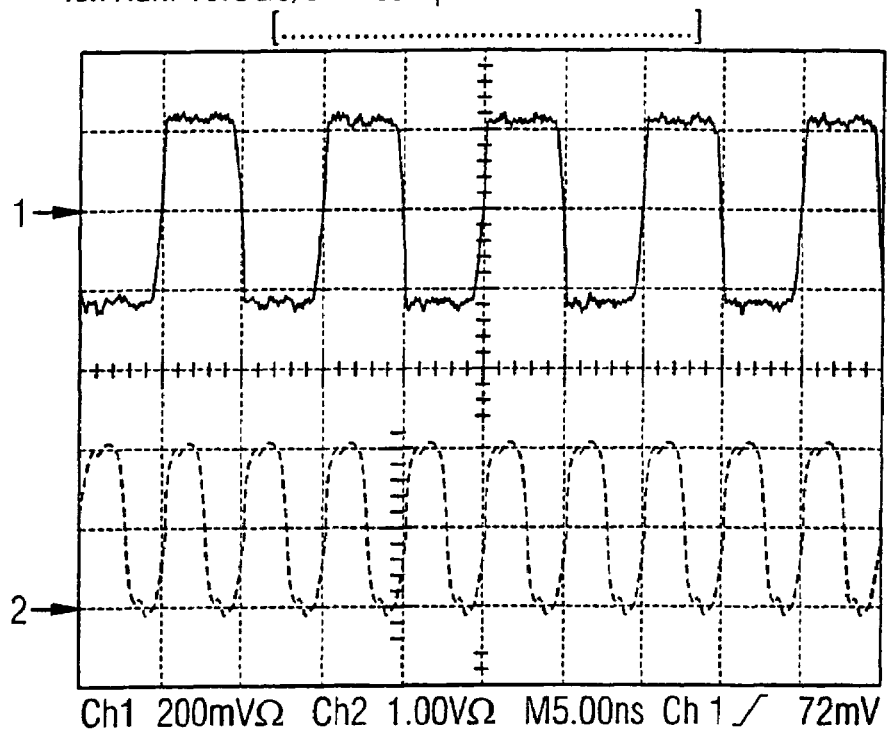
Ch1 200mVΩ  Ch2 1.00VΩ  M5.00ns  Ch 1 ╱  72mV
FIG 5  CH1 S Spectrum   10 dB/ REF 0 dBm
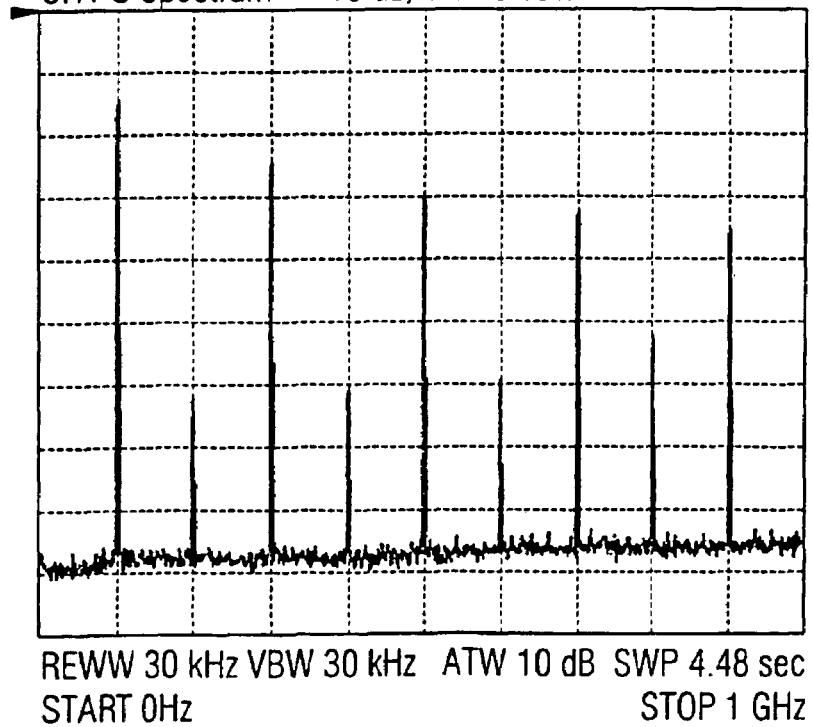
REWW 30 kHz  VBW 30 kHz   ATW 10 dB  SWP 4.48 sec
START 0Hz                           STOP 1 GHz FIG 6  Tek Stop: Single Seq 2.00GS/s
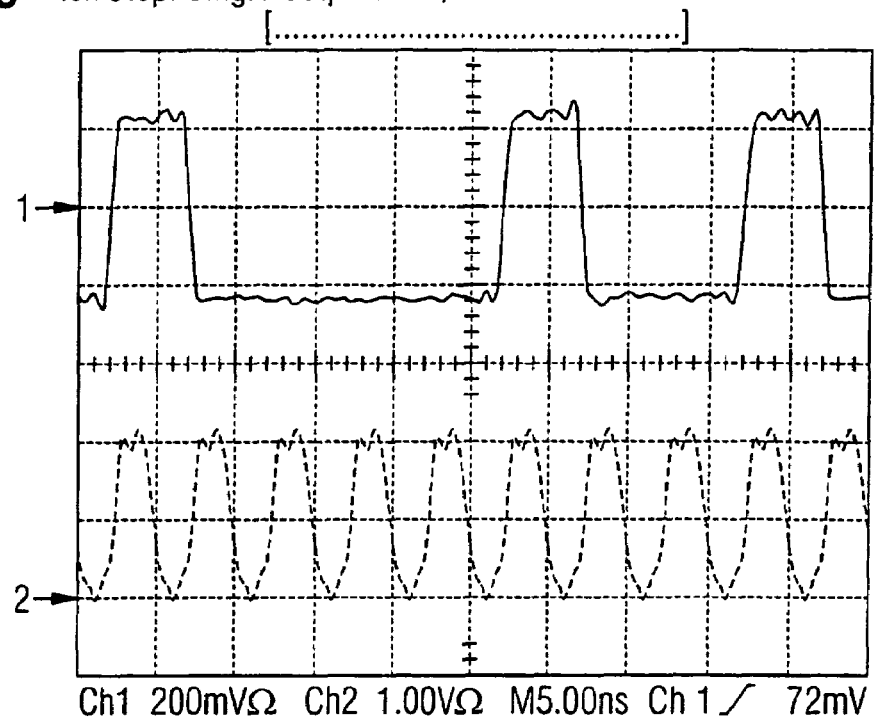
FIG 7  CH1 S Spectrum    10 dB/ REF 0 dBm
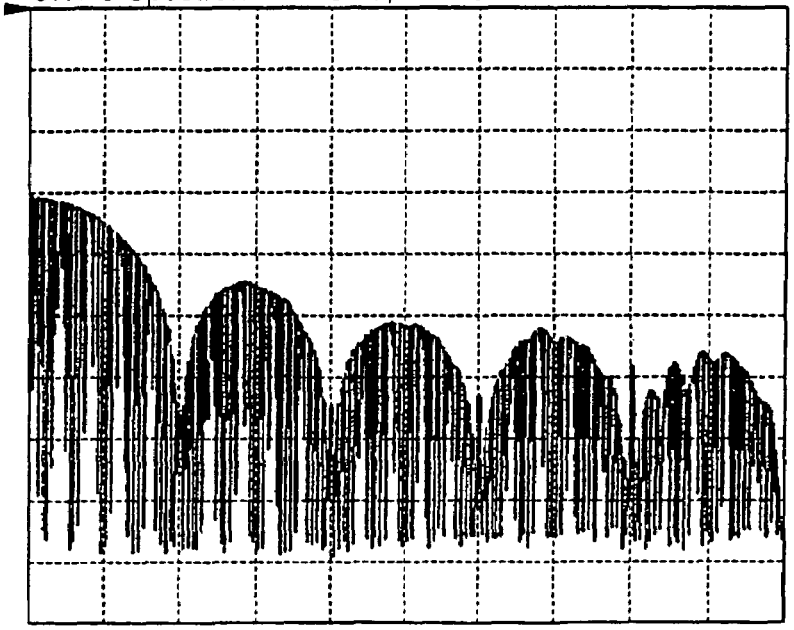
REWW 30 kHz  VBW 30 kHz   ATW 10 dB  SWP 4.46 sec
START 0Hz                            STOP 1 GHz

DEVICE FOR LOW-INTERFERNCE SIGNAL TRANSMISSION

FIELD OF THE INVENTION

The present invention relates to a device for or a method of improving the electromagnetic compatibility (EMC) of data circuits and of digital data circuits in particular.

PRIOR ART

The applications of digital data circuits are continuously expanding. In the majority of cases the digital signal transmission presents significant advantages over analog signal transmission. The costs of high-speed data channels are reduced by the development of new transmission techniques. The width of the individual channels has become very inexpensive so that multiplexing of several low-rate signal circuits to form a single high-speed signal circuit is often the most economic solution. This has been implemented particularly in high speed rotary joints.

The conventional solution for the transmission of high data volumes from rotating parts to stationary parts has been the parallel application of a large number of slip ring paths. This resulted in a solid structure of a very high weight, which incurred high costs. Even though mechanical slip rings are particularly well suitable for energy transmission they present some significant disadvantages for the transmission of huge data quantities, such as a restriction of the bandwidth, contact noise and failure.

Due to the large number of circuits having a data transmission capacity close to the physical limits of the contacting slip ring paths service life and maintenance were a main concern. The new contact-free high-rate circuits overcome all these problems and permit a maintenance-free service life with a maximum quality in transmission and with an almost unrestricted bandwidth.

A very important aspect not only in the application of contact-free high-rate circuits but of any electronic device is the electromagnetic compatibility. Electromagnetic emissions are most critical in wire-based circuits and in unshielded rotary joints, but even transmitters, receivers and amplifiers in circuits based on optical fibers may emit electromagnetic fields.

BRIEF DESCRIPTION OF THE INVENTION

The present invention describes how the electromagnetic compatibility (EMC) is dependent on the emitted signals, particularly in high-speed data circuits, and how these signals may be varied in such a way that the electromagnetic emissions will be minimized. The inventive device or the inventive method, respectively, are equally essential for the application of contact-free high-speed data circuits particularly in very large open units such as those designed for computer tomographs (CT scanner means).

In correspondence with prior art optional signals and digital signals in particular are transmitted in the base band or in a modulated form, predominantly in the form of more or less steep-edged rectangular signal strings. These signal strings present a distinct wide line spectrum as a function of the respective coding. This spectrum may result in interfering radiations already in closed or shielded systems, particularly, however, in open systems such as rotating data transmission devices revolving transmitters, which interfering radiation may exceed the limits defined in the common EMC standards. In this respect contact-less open transmission systems such as those employed for linear transmission or rotating transmission are particularly problematic. Leakage line systems are explicitly affected by this effect, too.

For a reduction of the noise level various provisions have become known. For instance, low-pass or even band-pass filtering is suitable to restrict the transmitted frequency range. This is, however, possible with difficulties only, especially in wide-band transmission systems such as transmission at 200 MBaud. For instance, a minimum bandwidth of 140 MHz is required for a 200 MBaud circuit. Another provision is the reduction of the transmitted signal level. This results, however, in a worse signal-to-noise ratio and hence also in an impairment of the bit error rate in digital systems. With the provisions in correspondence with prior art it is possible with difficulties only to improve the EMC characteristics of such a transmission circuit without impairment of the transmission properties as such.

The present invention is therefore based on the objective of configuring a digital transmission circuit, particularly a contact-free rotating data transmission circuit, in such a way that the emitted noise level may be reduced in the sense of the current EMC standards, without a corresponding impairment of the quality in transmission.

This problem is solved with the provisions defined in claim 1. In accordance with the invention the transmitted line spectrum of the signal is spread by modulation of the transmission cycle in such a way that the gaps between the individual spectral lines are filled and hence the mean spectral power density is reduced. An inventive system consists of a transmitter in correspondence with prior art, which comprises a clock generator, as well as a modulator unit which controls the transmitter or the clock generator thereof, or the transmitter output signal to an optional site in the transmission circuit in such a way that the spectrum will be spread. Such a control may be a phase or even frequency modulation, for instance. Amplitude-modulating or other modulating techniques are conceivable as well, however. Furthermore, a controller is provided which provides the modulator unit with the modulation signal.

The invention is unambiguously distinguished from a modulation technique for improvement of the EMC characteristics of an integrated circuit, which is known from prior art from a publication by the company of IC Works, 3725 North First Street, San Jose, Calif., U.S.A. of March 1997, entitled "Spread Spectrum Clock Generator". This prior art reference relates to the improvement of the EMC properties in computer boards, but not in transmission circuits.

Influence of Spectral Spreading on EMC Characteristics

The general term "Electromagnetic Compatibility (EMC)" is hard to define. Here reference is made to the very general CISPR 11 standard which defines limits for the maximum emission of electromagnetic energy and which specifies the suitable measuring techniques. This standard determines a measurement of maximum emissions in the frequency range of 30 MHz to 1 GHz. The emitted power is measured in 120 kHz steps with a bandwidth of 120 kHz. It is not definitely necessary in the application of a spectral spreading technique to have a uniformly distributed wideband spectrum; what must be duly considered is only the fact that the same amount of energy is supplied to each 120 kHz range. This can be achieved with a wide-band signal or an individual narrow-band peak in this range. For the majority of applications the spreading of this spectrum in lines having a spacing of 120 kHz or a safety spacing of 100 kHz from each other constitutes the most inexpensive solution. A further spreading of this spectrum requires the introduction of very small frequency variations in the data stream. In some applications, these modifications occur naturally, e.g. when "real data" such as video signals are transmitted.

However, provisions should be made to ensure that in extreme situations, e.g. when the video signal is deactivated and only digital zeros are transmitted, the spectrum is spread to a sufficient width so as to comply with the EMC specifications.

In the application of high-speed digital data circuits substantial provisions must be made to ensure that the requirements of the international EMC regulations will be satisfied. With data rates of a few hundreds to a few thousands of MBaud, the basic frequency comes under the range of common transmission, broadcasting and television bands. For a general reduction of interference it is better to transmit the information in one wide-band signal with a homogeneously distributed low spectral power density rather than information including a few discrete high-power spectral lines.

The invention describes how commonly applied digital data circuits can be modified in such a way that the spectrum undergoes a significant spreading.

There are two supplementing techniques available to achieve this. The first technique is the appropriate coding of the digital signal. The further technique is some kind of frequency modulation. This frequency modulation can be implemented anywhere throughout the circuit without influencing the transmitter or the receiver.

In accordance with the invention the conventional data coding is expediently applied for an optimization of the EMC characteristics.

Spreading of the Carrier Signal (Data Cycle Signal) of the Transmitter

In the transmitter the development of the data flow in time can be simply controlled by controlling the transmitter carrier signal. This requires a direct access to the transmitter carrier signal. One conventional solution is the substitution of a newly modulated oscillator for the standard quartz oscillator unit in the same unit.

In a particularly expedient embodiment of the invention the modulation unit is so configured that it subjects the cycle frequency of the clock generator of the transmitter to frequency modulation in correspondence with the modulation signals of the controller. Such a configuration is particularly simple to implement in engineering terms by providing a VCO in the frequency-determining element of the clock generator, which varies the frequency of the clock generator as a function of the control voltage applied thereto. The control voltage of this VCO is predetermined by the controller. When the controller now furnishes a low-frequency signal frequency of the clock generator of the transmitter varies with the timing of this signal, too, and hence it is frequency-modulated.

Frequency Modulation

Frequency modulation is the direct approach for spreading the spectrum. Serial standard transmission circuits such as TAXIchip® or Hot-Link® tolerate a static variation from the cycle frequency by ±0.1%. To observe the limits set for quartz oscillator tolerances the maximum frequency deviation should be less than $10^{-4}$. As the spreading of spectral lines does not furnish an advantage below 100 kHz, as has been set out in the foregoing, the minimum data rate $f_{Dmin}$ for low-rate frequency shifts is as follows:

$$f_{Dmin} = \frac{100 \, kHz}{10^{-4}} = 1 GHz \tag{6}$$

based on the formula $$f_{Min} = \frac{f_{Data}}{n_{Frame}} \tag{3}$$

wherein $n_{Frame}$ indicates the number of bits in data blocks, $f_{Data}$ signifies the data cycle frequency, and $f_{Min}$ represents the lower frequency limit.

This shows that low-speed frequency shifts do not furnish any improvements at data rates below 1 GBaud.

Phase Modulation

Phase modulation is simply achieved by insertion of a controlled electrical delay into the carrier signal (or clock signal). A low frequency of phase modulation can be automatically controlled in timing by the receiver PLL but it does not result in a significant spreading of the spectrum. A very high frequency phase modulation produces the desired effect on the spectrum but its behavior is comparable to an additional synchronization interference on the receiver input.

In another expedient embodiment of the invention the modulator unit is arranged downstream of the signal-processing and modulating stages of the transmitter so that it can directly modulate the output signal of the transmitter.

Modulation of the Data Stream

In accordance with the present invention, the spectrum can also be spread by modulating the transmitter output signal (or the data stream). The modulation or modification of the transmitter output signal (or the data stream) as such presents a great advantage over the modification of the transmitter carrier signal (or the transmitter data cycle signal, respectively). A modification in the transmitter as such is not required. The transmitter output signal (or the data stream, respectively) can be modified anywhere in the transmission circuit. Hence this system does not demand any modification of the transmitter design, which allows for low development costs and a smooth integration into existing designs.

In a further expedient embodiment of the invention the transmitter comprises a delay circuit controllable by the control generator, which delays isolated pulses or even only signal edges of the output signal in proportion to a low modulation frequency predetermined by the control generator. In the sense of the invention the term "transmitter" is to be understood to denote the combination of all units which process and combine data, signals or cycles in such a way that they can be transmitted via the transmission circuit as such. For the purposes of the present invention it is irrelevant whether this delay is achieved in the clock generator of the transmitter or in a subsequent stage or even as late as in a driver circuit for the transmission circuit.

Phase-shift Technique

The best way to modify an existing data stream without any influence on the data transmitter hence consists in the adoption of a controlled delay. The data stream is supplied to a delay controller means which analyses the data stream and generates a control signal $V_P$ for the controlled delay circuit. This circuit delays the data stream for an interval defined by $V_P$. An almost static delay, which has been modulated by a low frequency, corresponds to a phase modulation. This type of phase modulation produces only a minor effect on the width of the spectrum. In phase modulation the width of the spectrum is largely independent of the modulation frequency. Therefore the modulation angle must be increased for spreading the spectrum. A higher modulation requires specific circuits including memory elements, and this can no longer be implemented by means of plain delaying elements. Some kind of frequency modulation is more expedient here. Frequency modulation is a special case of phase modulation with phase angles integrated versus time.

Furthermore, the phase shift can be expediently implemented by a timing recovery technique.

In addition to the modulation by a modulator unit, data coding by means of pseudo-random noise can be expediently implemented.

In correspondence with another expedient embodiment of the invention a controller unit is provided in the receiver which controls the clock generator of the receiver in synchrony with the modulation of the transmitter. This synchronization can be optionally performed via a signal which is jointly available to the transmitter and receiver sides, such as the line frequency.

In a further expedient embodiment of the invention a controller unit is provided in the receiver, which, in the event of modulation of the frequency of the clock generator of the transmitter, controls the clock generator of the receiver in synchrony with this modulation so that the received signal can be processed further in the receiver in non-modulated form.

In another expedient embodiment of the invention an additional signal is transmitted in parallel with the transmission circuit between the transmitter and receiver sides for controlling the modulation. On account of this additional signal now a demodulation can be performed in the receiver, which is synchronized with the modulation in the transmitter.

BRIEF DESCRIPTION OF THE DRAWING

For an explanation of the invention Figures are attached wherein:

FIG. 4 illustrates a 200 MBaud 1010-PCM signal (upper graph) and a bit cycle signal (lower graph);

FIG. 5 represents the spectrum from 9 to 1 GHz of a 200 MBaud 1010-PCM signal;

FIG. 6 shows a 200 MBaud PCM signal with 10000100 pattern (upper graph) and bit cycle signal (lower graph);

FIG. 7 illustrates the spectrum from 9 to 1 GHz of a 200 MBaud PCM signal (10000100);

DESCRIPTION OF EMBODIMENTS

Figure 1:
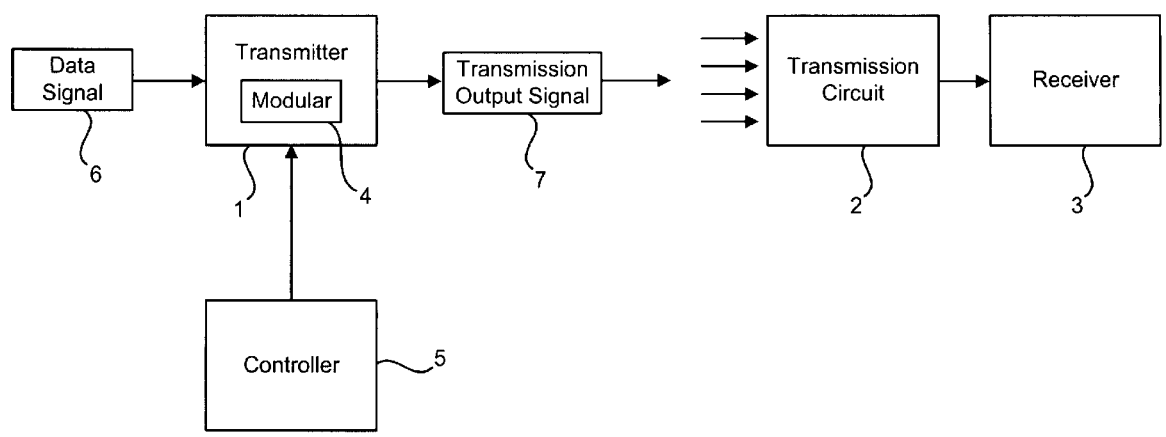
FIG. 1 shows an inventive system.

FIG. 1 shows an inventive system comprising of a transmitter (1) which is connected to the receiver (3) via a transmission circuit (2). The transmitter (1) includes a modulator (4) and is controlled via a controller (5). By means of controller (5) a modulation signal for modulating a data signal (6) or the frequency of the clock generator, respectively, is generated in such a way that the spectrum of the transmitter output signal (7), which is transmitted via the transmission circuit (2), will be spread. For receiver circuits corresponding to prior art a slight modulation, particularly a frequency modulation of the data signal (6), is no problem. The modification of the frequency, particularly at a low modulation frequency, is finely controlled, without any problem, by the PLL provided in receiver (3) for data and cycle reconstruction.

Figure 2:
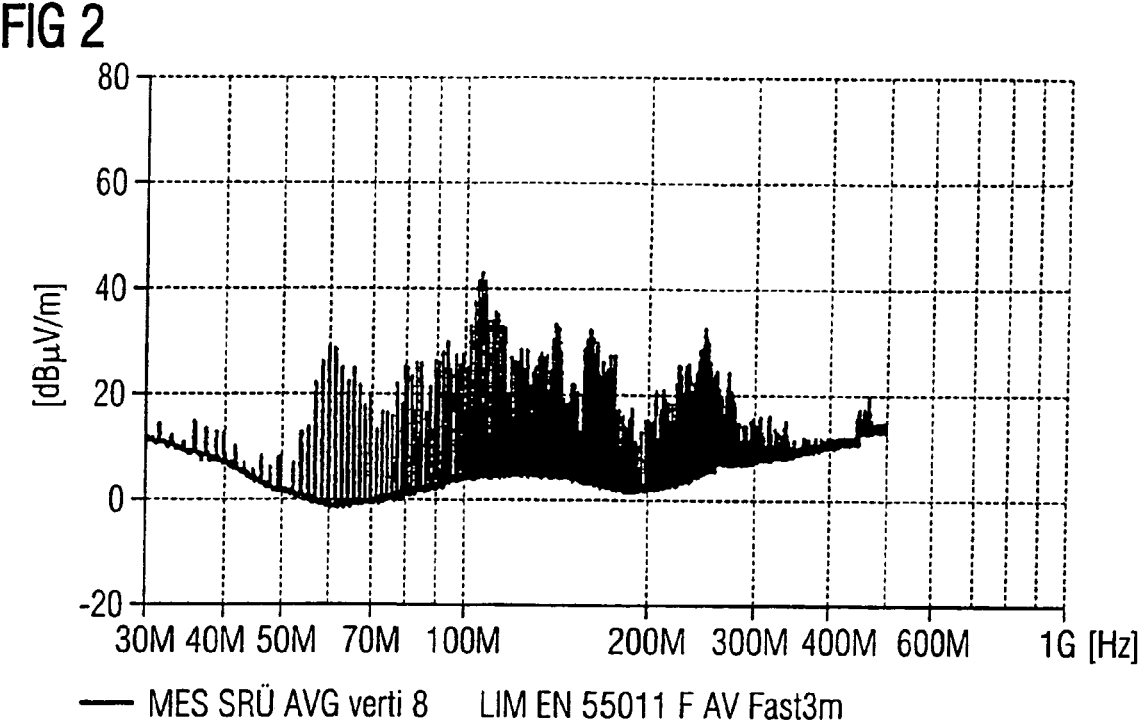
FIG. 2 illustrates the noise spectrum of a typical transmission circuit with 190 MBaud in the base band.

FIG. 2 shows the spectrum measured in an absorber hall, which is emitted by a transmitter corresponding to prior art via the data circuit (2).

Figure 3:
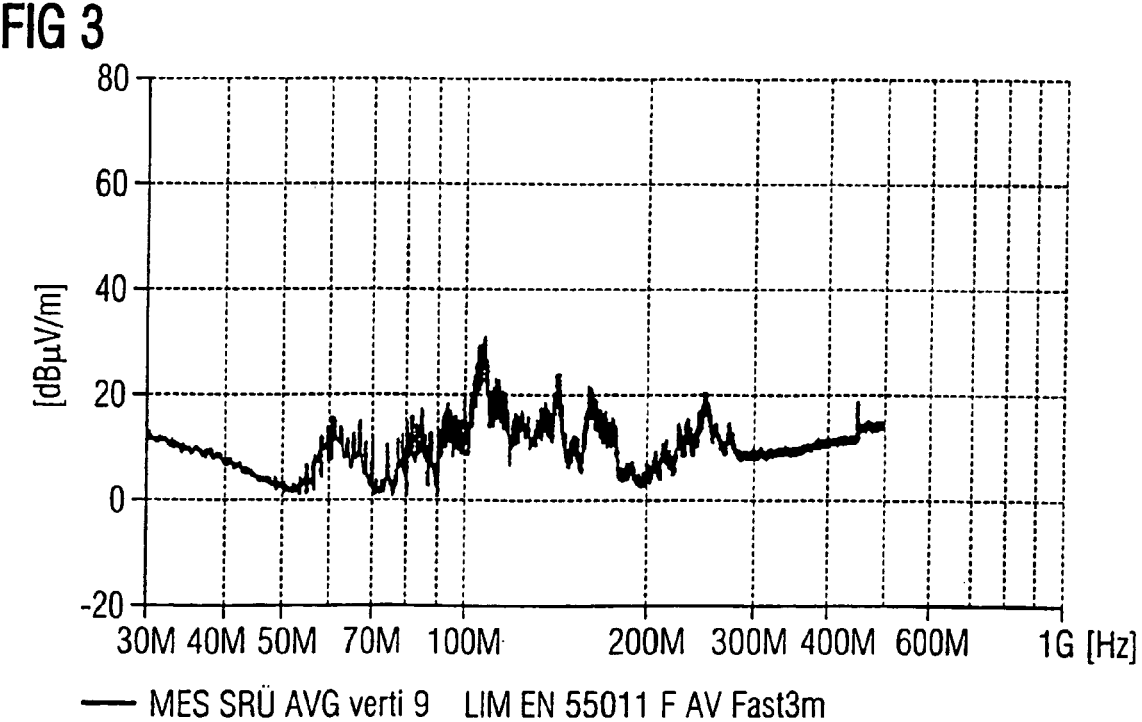
FIG. 3 shows the noise spectrum of the transmission circuit according to FIG. 2, with a frequency modulation of the clock generator.

FIG. 3 shows the spectrum of an inventive system wherein the control generator is employed to modulate the signal of the transmitter with a frequency shift by 2 MHz. As a result, also spectral fractions fall into the gaps between the spectral lines. With the same output signal amplitude the power density in the individual frequencies is hence reduced. The reduction of the maximum amplitude ranges at 16 dB approximately.

Frequency Spectrum of Digital Signals

Like in almost any digital data link the data stream is present in the PCM format, which means that only two digital levels—i.e. zero and one—are present. The information is contained in the presence of zeros and ones in defined time windows. For a signal with alternating zeros and ones the wave shape corresponds to a symmetrical rectangular wave (FIG. 4) having a frequency corresponding to half the bit cycle rate.

Such a signal presents the commonly known spectrum illustrated in FIG. 5.

What appears are only odd harmonics with a linearly decreasing amplitude. Even harmonics occur only if the signal is non-symmetrical. When the signal has other patterns with wider time intervals of zeros and ones, like the signal in FIG. 6, side bands appear in the spectrum with offsets by multiples of the frequency components of these longer time intervals. This leads from a plain needle spectrum to a multiply diversified spectrum such as that illustrated in FIG. 7.

When a great number of different patterns is present, e.g. in different combinations, the spectrum undergoes an ever-increasing diversification. For the majority of digital signals the average electrical power of the data is constant. In a measurement over a fairly long time interval the numbers of zeros and ones are approximately equal. For instance, the mean power $P_{Mean}$ of a random binary signal is the mean power of zero $P_0$ and one $P_1$:

$$P_{Mean} = \frac{1}{2} \cdot (P_0 + P_1) \quad (1)$$

In a spectral representation of the total of all amplitudes $A_i$ of the spectral lines this total must therefore equal this value:

$$P_{Mean} = \sum_i \overline{A_i} \quad (2)$$

Reduction of the Spectral Power Density

In our first example (FIG. 4) with the pattern 1010 high energy levels are present at the base frequency of the signal and its harmonics. If the signal is spread to additional frequencies the energy of the individual spectral lines must be reduced because the total energy is constant. Hence the unrestricted spreading of the bandwidth results theoretically in unlimited low energy densities. In practice, however, there are some restrictions.

Figure 8:
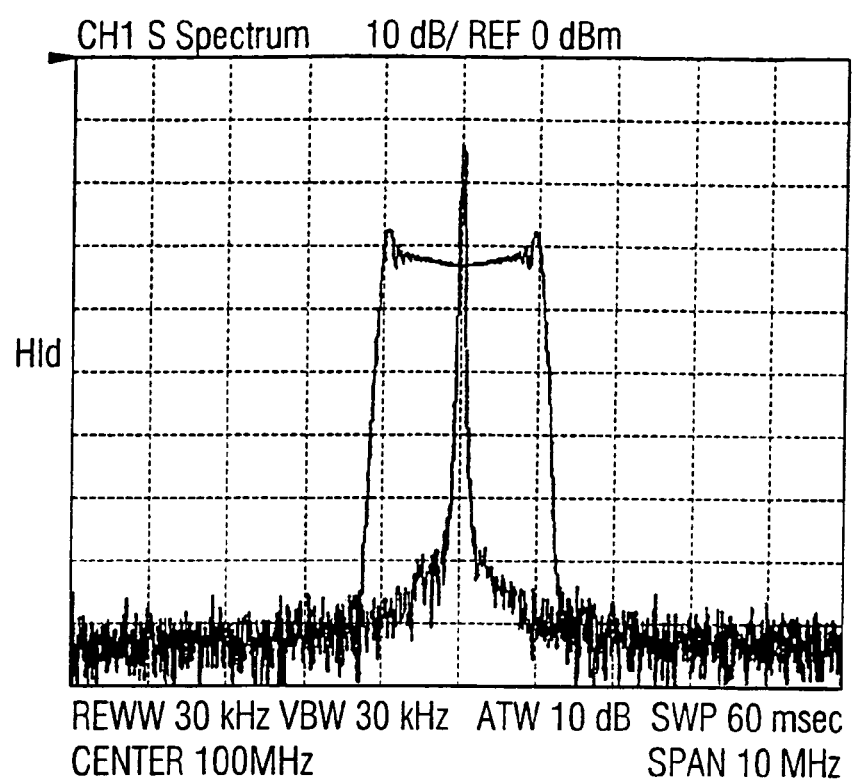
FIG. 8 shows the spectrum of a normal 200 MBaud PCM signal (narrow graph) and a 2009 MBaud PCM signal with frequency-modulated bit clock signal (wide graph) at an indicated center frequency of 100 MHz and a spacing by 10 MHz.
Figure 9:
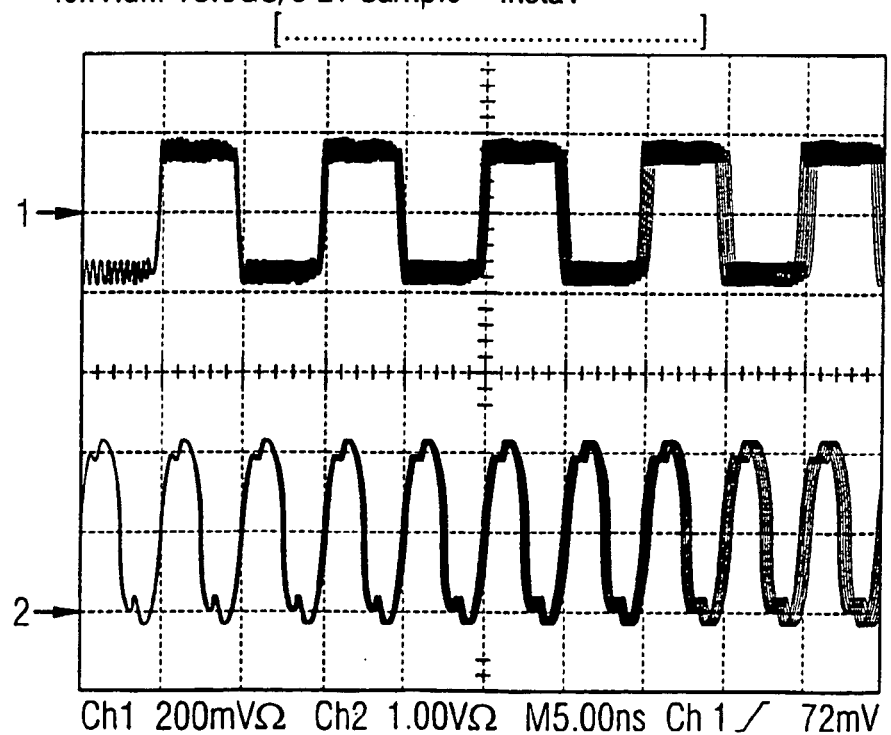
FIG. 9 is an illustration of the 200 MBaud signal in FIG. 8 (upper graph) with frequency-modulated bit clock signal (lower graph)

Even though bandwidths are not very expensive unrestricted bandwidths are expensive. A good design of a data circuit thus does hence not employ much more bandwidth than is necessary for the transmission of the information. But even the filling of the gaps between the spectral lines would furnish a substantial improvement. For an optimization of a data link the coding and the shaping of a signal should be made in such a way that an additional bandwidth will not be necessary and that instead of individual spectral lines a constant power spectrum with frequency-independent power densities is present. FIG. 8 illustrates a typical needle spectrum of a 1010 signal and with the second graph of the spectrum of the same signal, which has been modified for a wider bandwidth with a 2 MHz frequency modulation (FM). FIG. 9 shows the same signal and its clock signal in the time window of an oscilloscope. There is no significant difference between these two signals.

This shows that the EMC characteristics of a digital link can be significantly improved by a slight modification of the signal. In the following, different techniques will be described for spreading the spectrum.

General Data Coding Schemes

Data is usually packaged in blocks containing an additional block and error verifying bits. These additional bits are equally required for synchronizing the data receiver with the transmitter. A defined coding such as 8B/10B is often used for execution of these tasks. In this way an extremely long data stream composed of nothing but zeros and ones would never occur. Typical blocks including synchronization and error correction bits have sizes of $n_{Frame}$ of roughly 10 to 20 bits. This provides a lower frequency restriction and a spacing of the spectral lines with the block repetition rate even if the data contains nothing but zeros and ones. At a data cycle rate $f_{Data}$ the lower frequency limitation $f_{Min}$ and the minimum spacing of the spectral lines correspond to:

$$f_{Min} = \frac{f_{Data}}{f_{Frame}} \quad (3)$$

As a rule, the data is additionally coded to ensure freedom of continuous current and to increase the redundancy for a plain error detection. Both data packaging and coding enable the spreading of the spectrum. A low packaging density results in a comparatively high packaging repetition rate and therefore in a moderate spreading of the spectrum. For instance, at a data cycle signal rate of 200 MHz, a 10-bit block furnishes a spectral line spacing of:

$$f_{Min} = \frac{200 \text{ MHz}}{10} = 20 \text{ MHz} \quad (3)$$

This means that not only spectral lines occur in the spectrum at 100 MHz, 300 MHz, 500 MHz, etc., but also additional lines spaced at 20 MHz. This furnishes five times as many spectral lines at a mean reduction of power by 7 dB. Such coding alone is not sufficient for an efficient EMC improvement.

Pseudo-Random Patterns

A data stream including a random succession of zeros and ones results in a very homogeneous spectral distribution. In theory, an unlimited random succession would result in a perfect spreading spectrum having a constant spectral power density. It is disadvantageous that such a data stream cannot contain the desired information. In an approach to a solution to this problem it is possible to employ deterministic pseudo-random patterns. These patterns consist of a predetermined reproducible string of bits. As a rule, the length of these patterns is determined. These patterns are referred to as pseudo-random patterns because; at the first glance, they look like a random string even though they yet present a determined succession and can be predicted. A genuine random succession can never be predicted.

Influence of the Pattern Length on the Spectral Density

Pseudo-random patterns used in practical applications have a restricted pattern length. After the emission of $n_P$ bits the same pattern is repeated. The reasons for short patterns are limited memories for storing the patterns and a simpler synchronization. A long pattern and therefore a low pattern petition rate furnish low frequency components in the signal and therefore lead to a narrow spacing of the spectral lines.

The minimum spacing Δf of adjacent spectral lines is reciprocally proportional to the random pattern length $n_P$:

$$\Delta f = \frac{f_D}{n_P} \quad (5)$$

Figure 11:
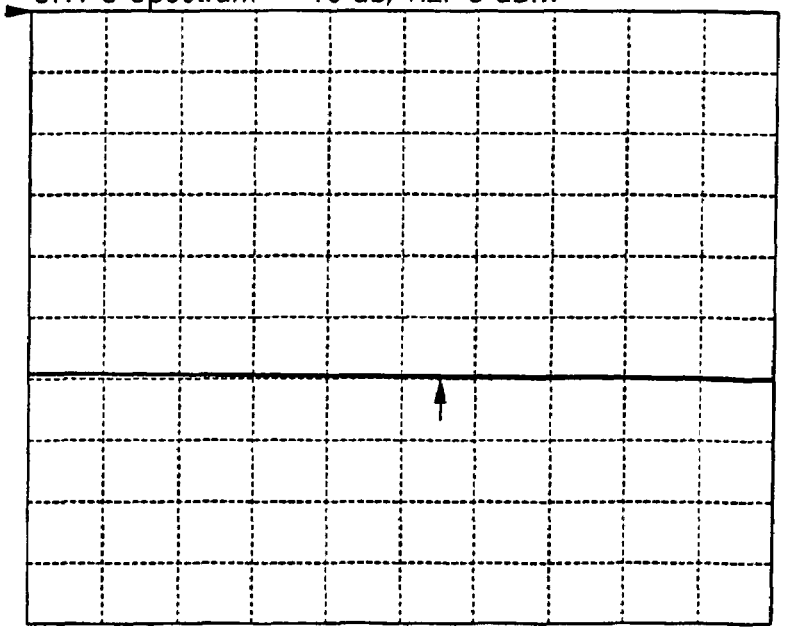
FIG. 11 illustrates a 200 MBaud PCM-PN15-spectrum (pseudo noise with 32768 bit pattern length) having an amplitude of −60 dBm and a line spacing by 6.1 KHz.
Figure 12:
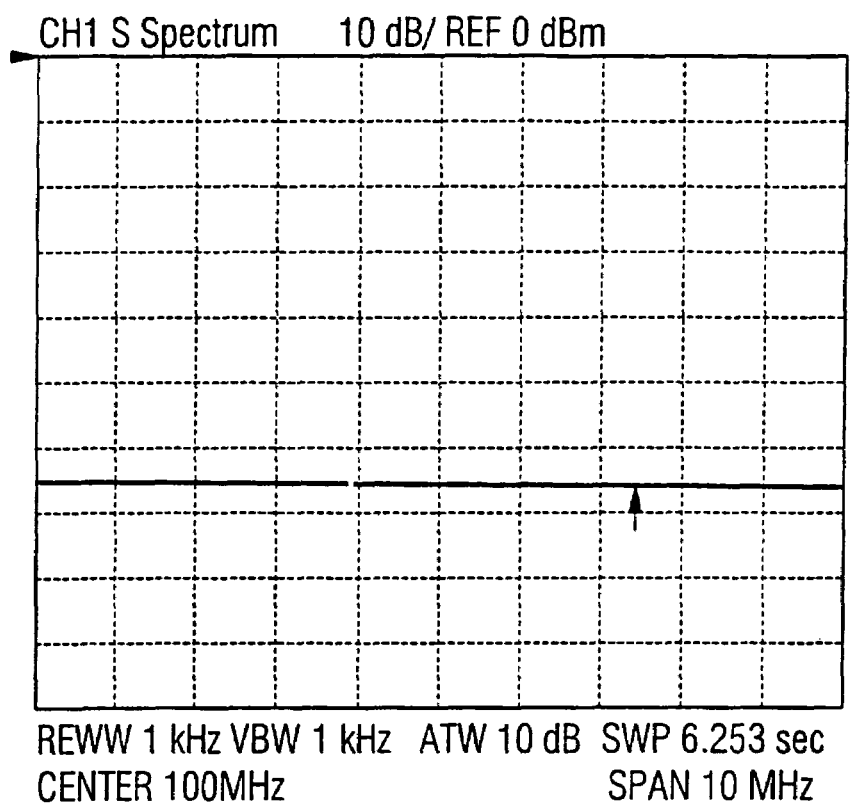
FIG. 12 shows a 200 MBaud PCM-PN17 spectrum (pseudo noise with 131072 bit pattern length) having an amplitude at −54 dBm and a line spacing by 1.5 KHz.

Thus a long pattern length is desirable for a small spacing of the spectral lines. The influence of the pattern length is illustrated in FIGS. 10, 11 and 12

Figure 10:
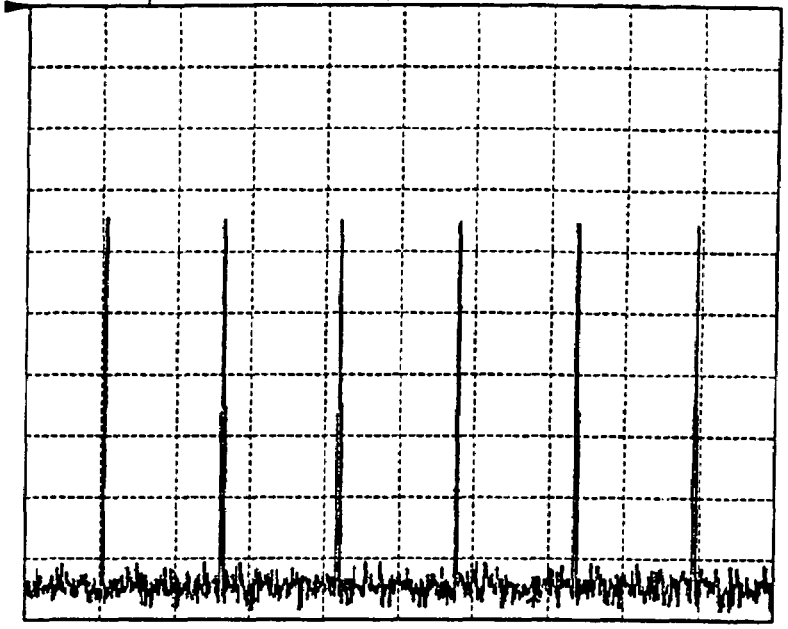
FIG. 10 shows a 200 MBaud PCM-PN7 spectrum (pseudo noise with 128 bit pattern length) having a peak amplitude of −36 dBm and a line spacing by 1.56 MHz.

In FIG. 10 the spectral lines are spaced by 1.56 MHz whilst their amplitudes amount to −36 dBm. If, as is shown in FIG. 11, a longer code string is selected, with the pattern length being 256 times as long, the spectral lines are spaced by 6.1 KHz. This is below the resolution of the spectral analyzer which displays a straight line. The amplitude of the spectral lines (which is identical with the amplitude of the line) amounts to −609 dBm, which corresponds exactly to $\frac{1}{256}$ of the previous amplitude of −36 dBm. In FIG. 12 a pattern length is applied which is four times the previous length, which results in a signal amplitude four times smaller (−6 dB).

Application of Prior Art Pseudo-Random Patterns

A plain approximation for very short pseudo-random strings is a coding scheme such as the commonly applied 4B/5B or 8B/10B coding. Here 8 bit binary numbers are encoded in a string of 10 varying bits. In this manner a long succession of zero bits will not derive even from a zero. These patterns produce a slight spreading effect but they furnish a more homogeneous spectral distribution.

Moreover, a highly common application of pseudo-random patterns are bit error rate tests where the wide-band spectrum of these patterns allows for a complete check of the entire transmission system.

Static Patterns

The mostly serial transmitters operate on a blank character if there is no data to be transmitted. This blank is an unambiguous pattern which enables the identification "no data" and furthermore permits the synchronization of the receiver with the transmitter clock signal. Only one kind of blank pattern is usually present. If over prolonged periods of time no data is transmitted only this pattern is transmitted via the circuit. It presents the same length as a standard data word and has therefore a comparatively high lower frequency and a spacing of the spectral lines which derives from the equation (5). Such patterns do usually not present a straight distribution of their spectral lines. Consequently, a high-speed data link may display excellent EMC characteristics when real data is transmitted. But as soon as the transmission is terminated and a blank is transmitted the EMC characteristics are strongly impaired. These static patterns are the most inexpedient case of electromagnetic emission or transmission. If a transmission of these patterns cannot be avoided over a prolonged period of time the EMC measurements should be made under these conditions.

In the definition of a sound system such static patterns should be avoided by all means. This may be achieved by the transmission of varying receiver blanks or by the emission of a pseudo-random string signaling the blank character state. Even a long string of zero codes may be accepted provided that this string is coded with a pseudo noise signal having a long pattern length.

Inventive Method of Spreading the Bandwidth

As has been described in the foregoing, there are different approaches for spreading the spectrum. The best effect on the electromagnetic emission is achieved when at least two methods are applied which complement each other. A very good combination is a pseudo noise data coding together with some kind of modulation of the data variation in time. The data variation in time can be modulated in different ways. One approach is the modification of the original data cycle signal at the transmitter end. Another way is the modification of the variation in time of the data stream as such.

Data Coding

Figure 13:
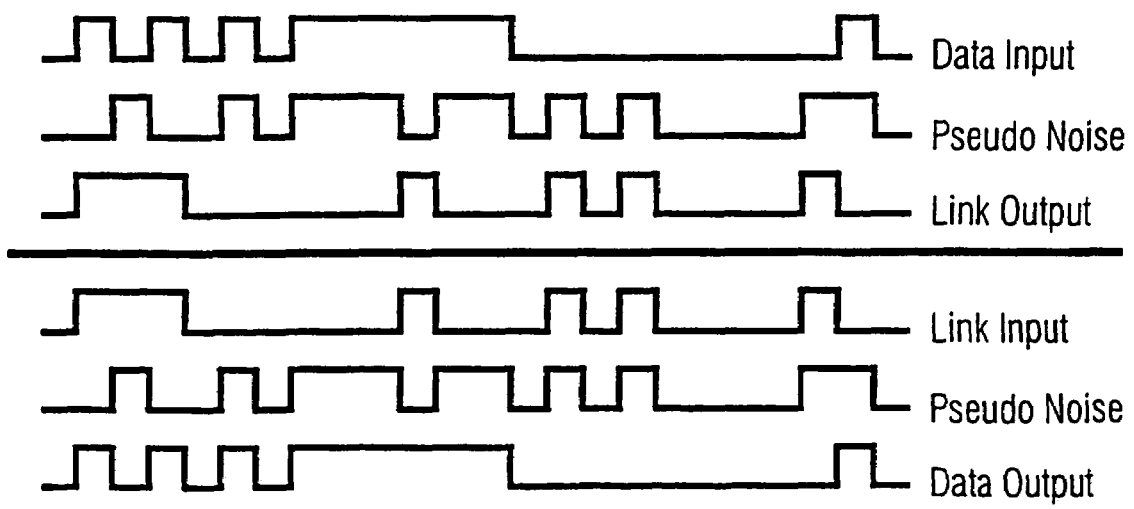
FIG. 13 shows a random coding (upper three graphs) and decoding (lower three graphs), with coding being realized by an exclusive-OR linking of the data with a pseudo noise string.

As has been set out in the foregoing, the data stream should have the appearance of a random string for optimization of the EMC characteristics. Real data very often displays random characteristics. In measuring signals or video image signals a certain noise always occurs which contributes also the random characteristics. In other cases the coding of the data stream with a random string would furnish a desired result. This coding is very easy to implement. When data is transmitted in large blocks each block may be subjected with a given random string to an exclusive-ORing process (FIG. 13). Now the transmitted signal has the appearance of a random signal. Even in the worst case of a string of zeros or ones the signal looks like a random signal.

The receiver can reconstruct the original data as the original data block by the exclusive-ORing of the block with the same random string. In an alternative, the signal may be supplied to a traditional pseudo random generator which may be based on shift registers with feedback.

There are certain situations which should be focused on. The majority of data parallel-serial converters present a defined "no data" signal which enables these converters to synchronies in the case of missing data. If the parallel-serial converter is not supplied with data it will continuously transmit this short data word which consists normally of a succession of 10 to 20 bits. This signal results in a very broad frequency line spacing and therefore in very bad EMC characteristics. Therefore one should avoid by all means that a static pattern is pending for transmission. To prevent this situation data must be supplied to the parallel-serial converter. This may be done by means of a simple software modification. Instead of not transmitting data the same blocks may be transmitted which are used for data but which are filled with zeros or a few other patterns which can be identified as "no data". When the stream of zeros is subjected to an exclusive-OR combination with the random pattern this furnishes a perfect random pattern in the data link and therefore the best EMC characteristics. Following the exclusive OR combination with the random pattern the stream of zeros can be easily identified as "no data" on the receiver side.

As has been set out in the foregoing, the spacing of the spectral lines is reciprocally proportional to the pseudo random pattern length. The minimum spacing of the spectral lines can be computed by the equation (3). The data coding operation should be completed by the application of a technique of modulating the variation in time. When very long code strings are not employed a data coding technique is best suitable to furnish a rough spreading whereas a modulation of the variation in time is best suitable to result in a fine spreading.

Spreading of the Data Cycle Signal

In the introduction both the frequency modulation and the phase modulation have been described.

For achievement of an improvement for lower data rates in case of frequency modulation the cycle must be shifted by more than the permissible $10^{-4}$. This can be achieved by synchronous shifting of the transmitter and receiver cycle. For execution of this shift a low-frequency message transmission must be provided between the transmitter and the receiver. Such an information can be transmitted via an additional low-frequency line or, in the case of rotary joints, through a conventional slip-ring circuit. In such a case noise and bandwidth are not critical. Another approach is the application of some signals which are already jointly available, like in the case of an AC energy circuit for modulating the synchrony between the transmitter and receiver cycles. Hence an additional signal is not required.

Better results can be achieved with a modulation of the clock signal with a very high frequency proportional to time. The modulation should be very fast so that the receiver PLL cannot follow the frequency variations. If the overall phase shift is too large the receiver may lose data. In such a case a similar technique may be applied such as that described in the introduction with respect to the phase shift technique. This solution should be generally matched with the link and its actual data cycle rate.

Figure 14:
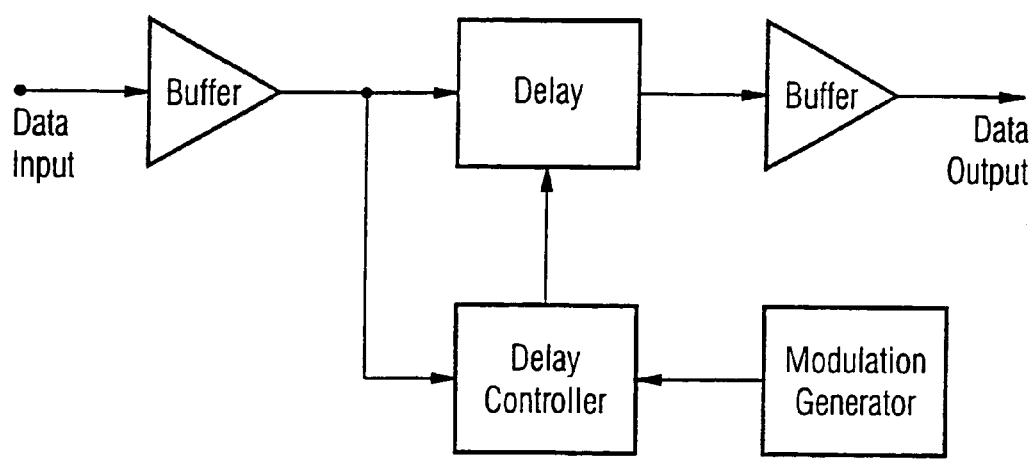
FIG. 14 illustrates a controlled phase shifter means.

The modulation of the data stream and the phase shift technique have been presented in the introduction. FIG. 14 shows the block diagram of the circuitry for the phase shifting technique.

Figure 15:
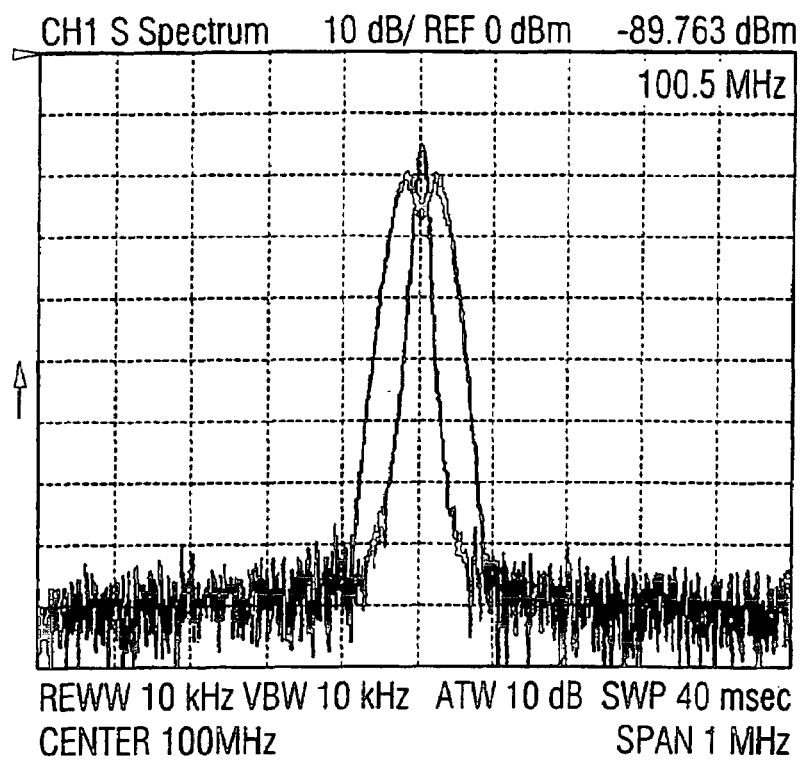
FIG. 15 shows a 200 MBaud PCM basic frequency at 100 MHz (narrow peak) and the spectrum of a phase-modulated signal with 6.28 rad at 10 KHz (wide peak)

FIG. 15 illustrates a phase-modulated signal with a 6.28 rad modulation at 10 KHz. This phase shift by 6.28 rad corresponds to a complete period.

Figure 16:
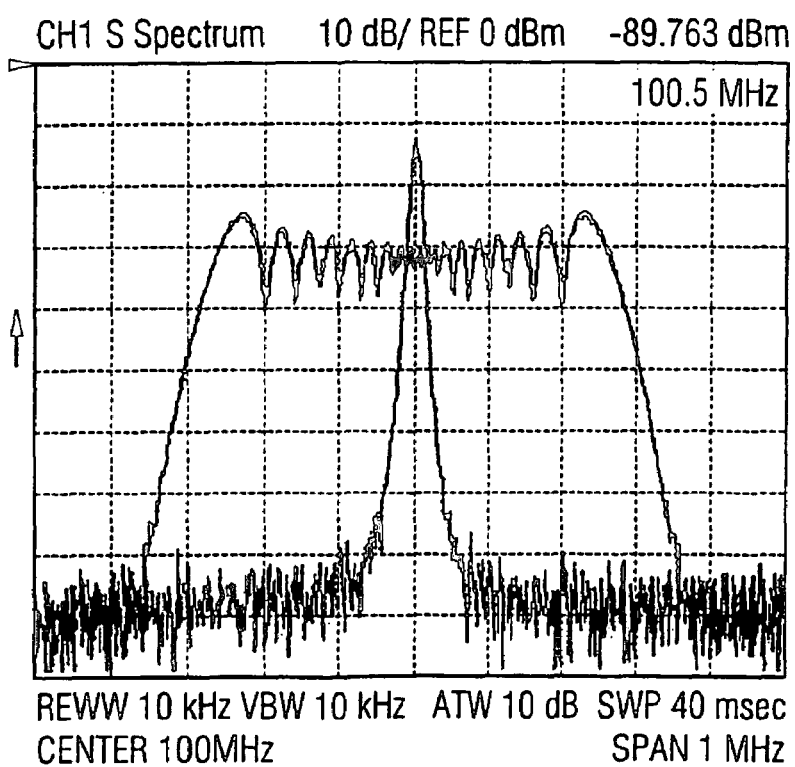
FIG. 16 illustrates a 200 MBaud PCM basic frequency at 100 MHz (narrow peak) and the spectrum of a frequency-modulated signal with 1 MHz (wide peak)

FIG. 16 shows some kind of frequency modulation with a frequency modulation at 1 MHz. The frequency modulation is a special case of a phase modulation with phase angles integrated versus time.

Figure 17:
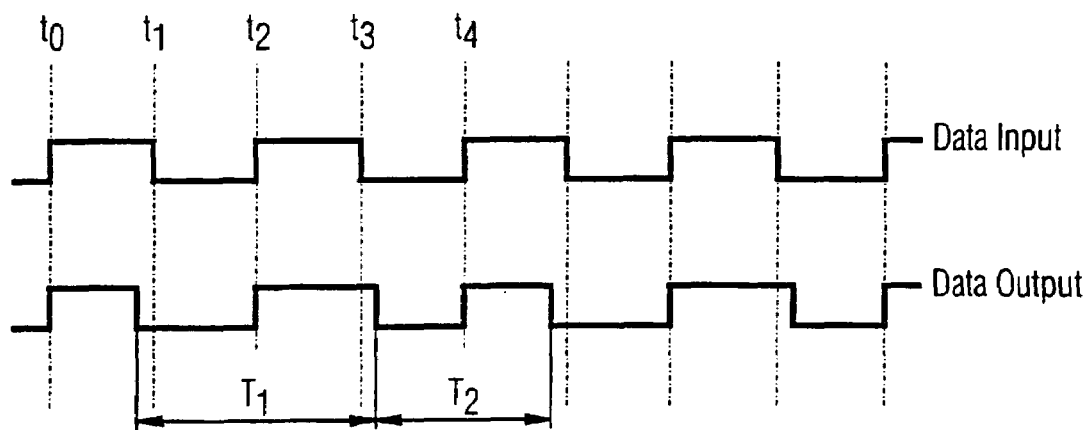
FIG. 17 is a graph of a plain frequency-modulated signal.

A simple example of such a frequency-modulated signal is shown in FIG. 17. The input signal presents a constant cycle rate. This means that all time intervals $t_n - t_{n-1}$ have the same width. In the case of a controlled delay circuit the clock signal variations by the times $t_0$, $t_2$, $t_4$, $t_6$, $t_8$ do not present any delay whereas the variations by the times $t_3$, $t_7$ display a small positive delay $\Delta$ and the variations at the points of time $t_1$, $t_5$ show a small negative delay $-\Delta t$. As a consequence, the first clock signal cycle $T_1$ is longer than the second clock signal cycle $T_2$. Hence $T_1$ can be expressed by the following formula:

$$T_1 = T_2 + 2 \times \Delta t \qquad (7).$$

For this reason, the basic frequencies of both clock signal cycles are equal:

$$f_1 = \frac{1}{T_1} = \frac{1}{T_2 + 2 \cdot \Delta t} \qquad (8)$$

$$f_2 = \frac{1}{T_2} \qquad (9)$$

Figure 18:
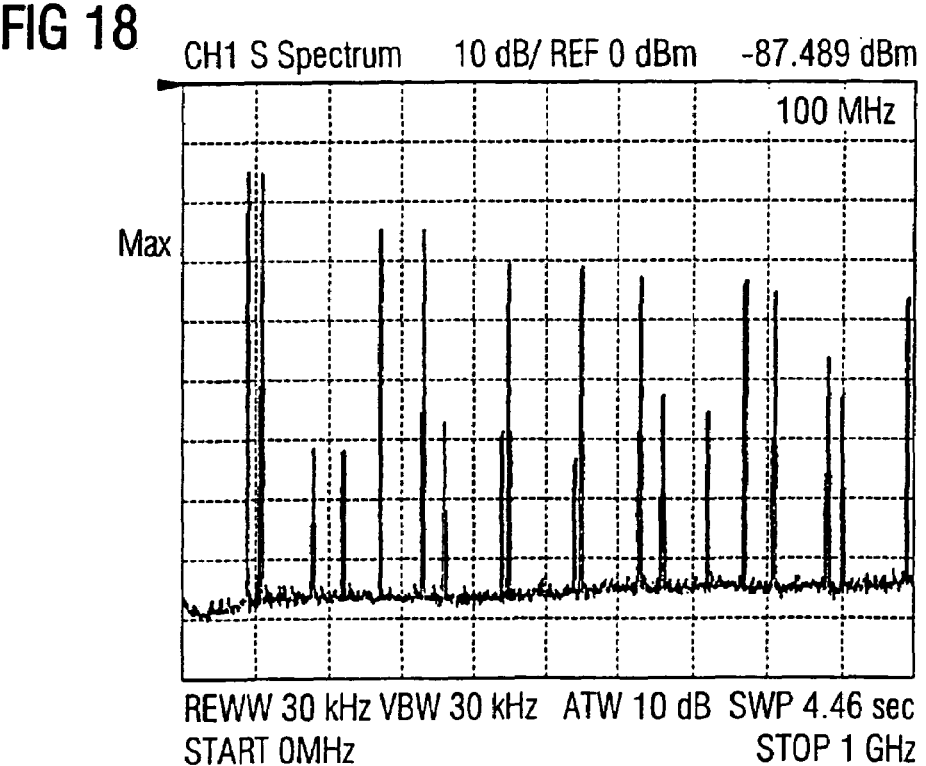
FIG. 18 illustrates a doubled spectrum.

Now the number of the spectral lines has been doubled (FIG. 18).

For a further increase of the number of spectral lines it is possible to introduce additional frequencies $f_1$ and $f_2$. To achieve this it is only necessary to vary the delay $\Delta t$ in correspondence with the equations (8) and (9).

Figure 19:
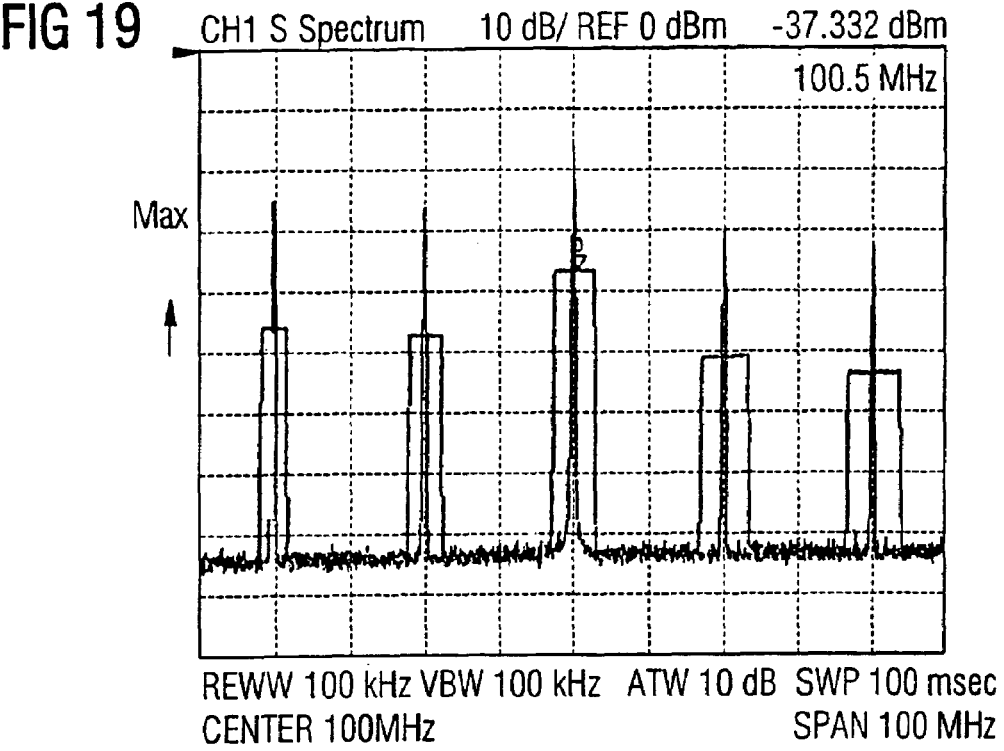
FIG. 19 shows an FM-spread spectrum at a low frequency shift.

To this end the delay control means is controlled by an additional modulation generator which forces the delay control means to go through all delays between $\Delta t_{Min}$ and $\Delta t_{max}$ at a very low frequency. Thus the spectral lines between $f_1$ and $f_2$ are filled, as is illustrated in FIG. 19.

Figure 20:
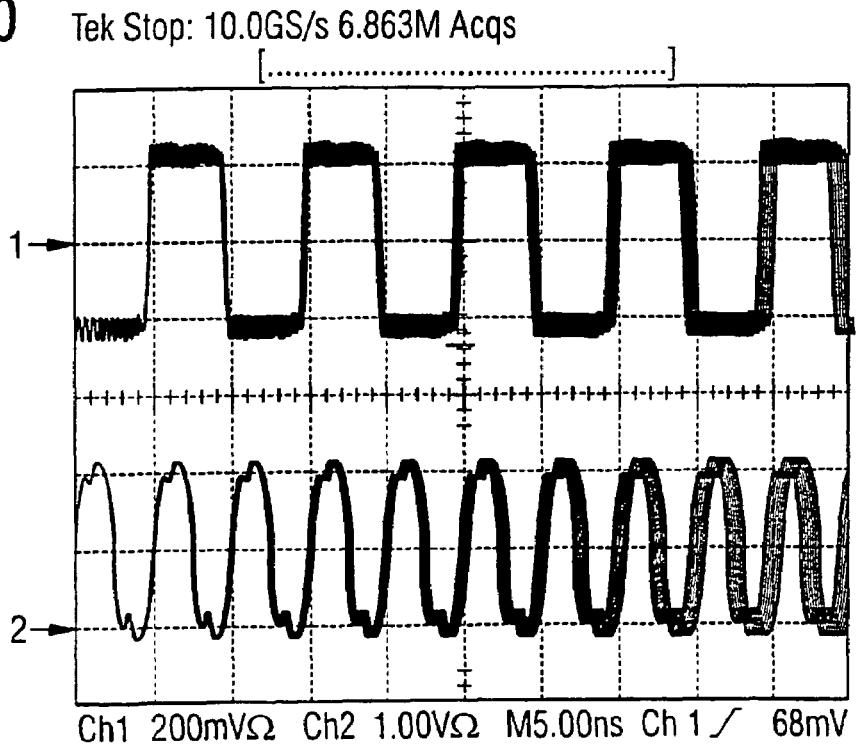
FIG. 20 shows an FM-PCM signal (upper graph) and a bit clock signal (lower graph) with a low frequency shift.

On account of the very small additional delays the signal behaves like a signal with additional low synchronizing interferences (jitters) (cf FIG. 20). This additional jittering presents two spectral components which must be considered. Initially, the high-frequency modulation behaves like a real jitter. It takes an influence on the link properties. For contact-free rotary joints, however, which present a 5% jitter, an additional modulation jittering of 5% is acceptable. The majority of digital link receivers accept 20% jittering without any impairment. Secondly, the low-frequency component of the modulation generator is so selected that a period is slightly shorter than the period of the integration of the EMC measurement. For measurements in compliance with CISPR lithe period lasts for 10 ms. Hence the modulation frequency should be higher than 100 Hz. This low frequency is eliminated by all receiver PLLs.

Cycle Regeneration Technique

Figure 21:
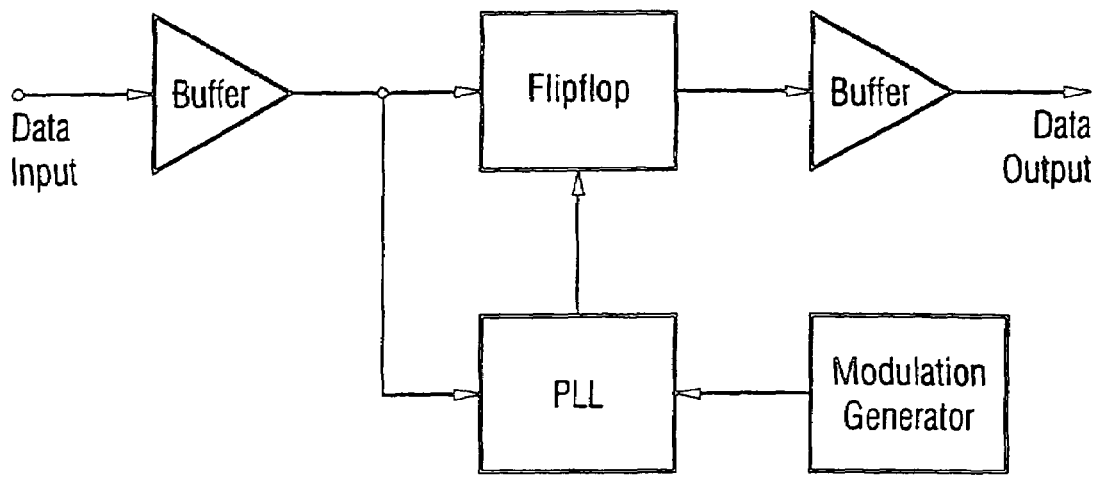
FIG. 21 illustrates a modulation by means of cycle regeneration.

Another approach to modify the spectral characteristics of the data stream is the use of a complete synchronization (re-timing) circuit. FIG. 21 shows the fundamental mode of operation. The data stream is supplied to a PLL circuit for recovery or regeneration of the data cycle. This regenerated clock signal is supplied to a synchronization (re-timing) circuit for the data stream. An additional modulation generator means varies the PLL frequency for modulating the data stream.

This circuit displays a behavior similar to the properties of the aforedescribed circuit but it performs additionally a synchronization (re-timing) and therefore a reduction of jittering in the data stream. There are two possibilities available for controlling the PLL. The first opportunity is modification of the digital PLL output signal and the introduction of additional delays. Another possibility consists in controlling the VCO by means of an analog signal. For implementation of this concept the VCO could be initially supplied with a small negative pulse which is supplied to the control voltage thereof, and after one or several periods the VCO is supplied with a small negative pulse having the same amplitude. This results in a rapid transient frequency variations which is so rapid per se that the PLL as such cannot respond thereto.

Like in the case of cycle modulation additional jittering is introduced into the data stream.

Measurements on Modified Digital Signals

Figure 22:
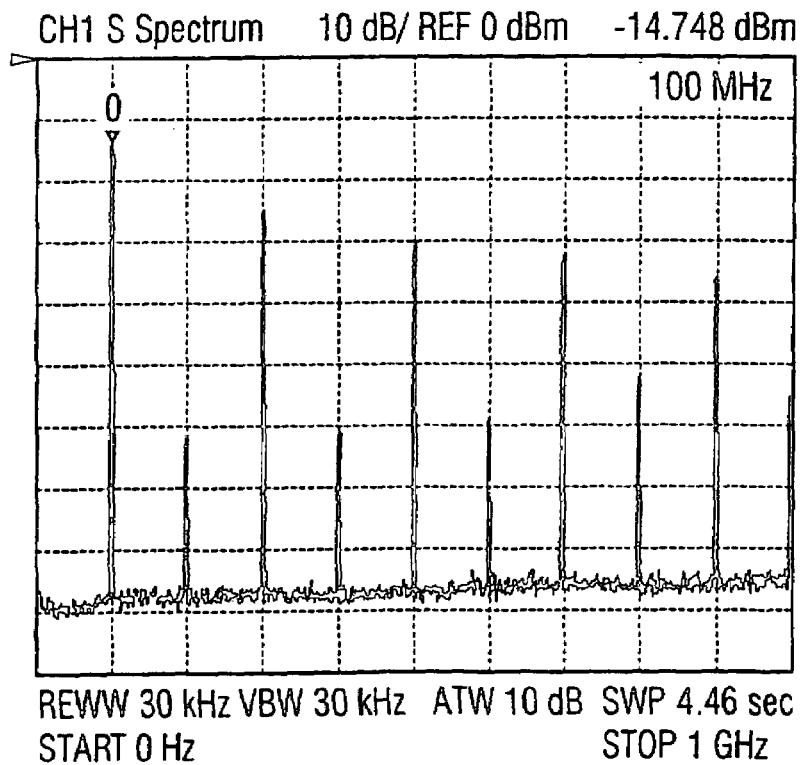
FIG. 22 is a view of a 200 MBaud 1010 PCM signal spectrum from 9 to 1 GHz.
Figure 23:
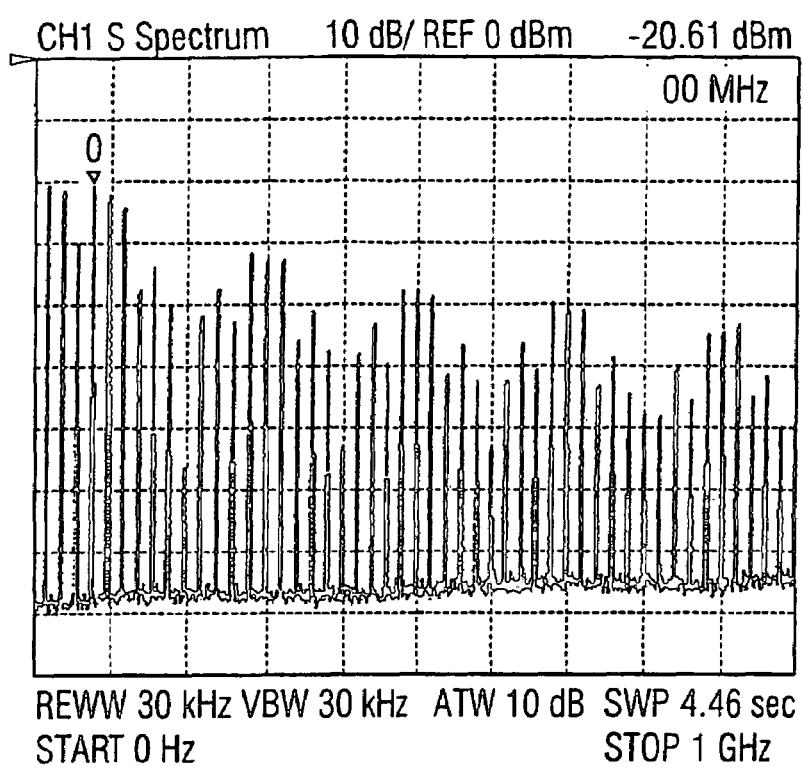
FIG. 23 is a view of a 200 MBaud 1010-PCM signal spectrum with 8B/10B coding from 9 to 1 GHz.

Some final measurements show the benefit of a PCM signal with spread spectrum. FIG. 22 illustrates the worst case of a 1010 PCM signal at 200 MBaud. Here the peak value of the amplitude at 100 MHz is equal to −14.7 dBm. When a genuine 8B/10B coded signal is employed the spectrum has the appearance shown in FIG. 23. In this example now the maximum amplitude corresponds to −20.6 dBm while the minimum spacing of the spectral lines amounts to 20 MHz. On account of the short-length coding this spectrum does not present a homogeneous spreading. It does not display a constant power density, which would be desirable, but on the other hand it presents some peak values with intermediate zeros. However, even this configuration furnishes an improvement by approximately 6 dB as compared to the worst case of a 1010 signal.

Figure 24:
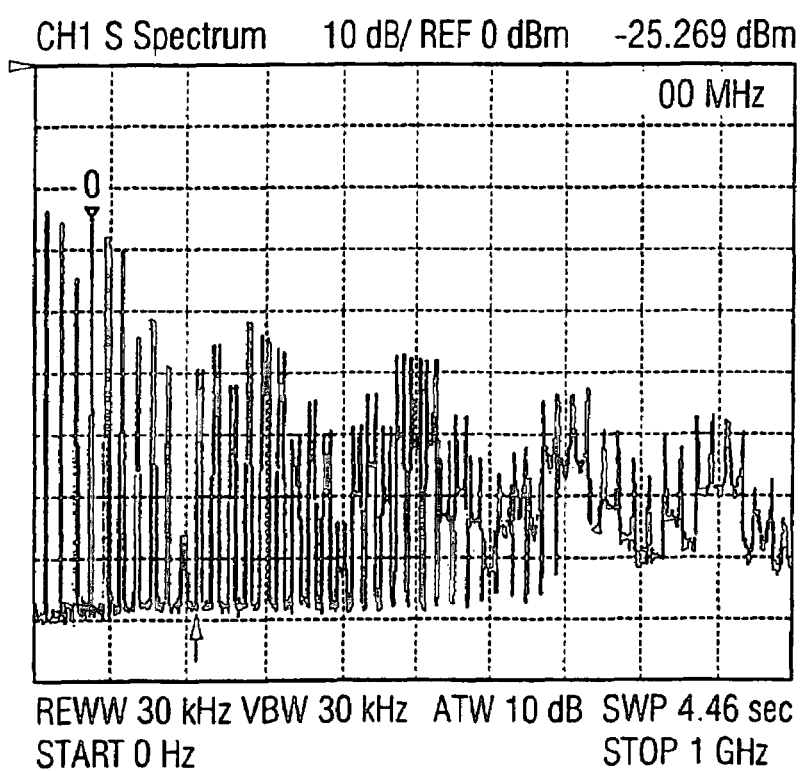
FIG. 24 is a view of a 200 MBaud 1010-PCM signal spectrum with 8B/10B coding and FM from 9 to 1 GHz.
Figure 25:
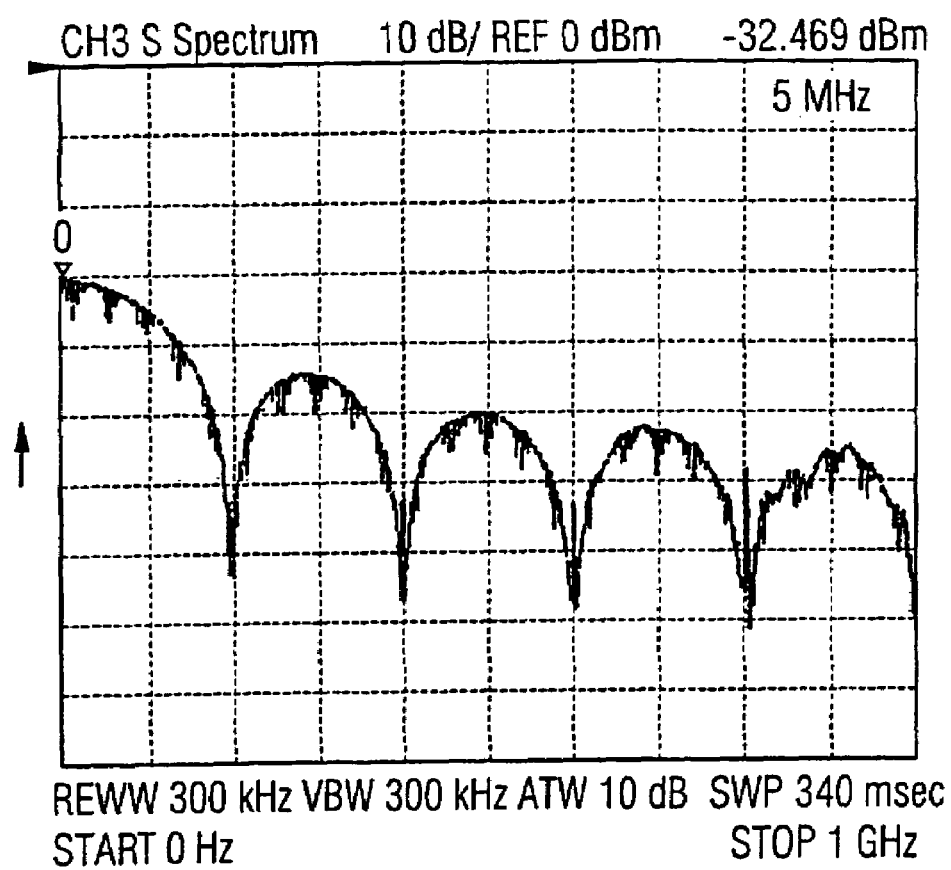
FIG. 25 is a view of a 200 MBaud 1010-PCM signal spectrum with pseudo-random coding from 9 to 1 GHz.

When frequency modulation is performed on the 8B/10B signal the spectrum according to FIG. 24 is obtained. Now the maximum amplitude equals −25.3 dBm, with a further improvement by 5 dB. Here the frequency modulation fills only the gaps between the 8B/10B signal spectral lines but is not suitable to smooth the spectrum. The coding with a long pseudo noise string having a pattern length of 128 bits furnishes a very uniform spectrum presenting a maximum amplitude of −32.5 dBm, as is shown in FIG. 25. The measured values confirm the theoretical considerations. Some variations are caused by restrictions and simplifications of the theoretic model.

The invention claimed is:

1. System for low-interference transmission of a signal, comprising:
a transmitter for generating an output signal to be transmitted via a transmission circuit, the signal having substantially a line spectrum;
a modulator unit associated with the transmitter for modulating the output signal to be transmitted, or a carrier signal of transmitting means in the transmitter, or the output signal at any site in the transmission circuit, independently of a modulation technique selected for the purpose of signal transmission;
a receiver, spatially separated from the transmitter, for receiving a modulated transmitted signal via the transmission circuit; and
wherein the modulator unit modulates the signal so that spectral lines of the output signal are broadened to fill gaps between individual spectral lines, and a spectral power density of the output signal is reduced without a bandwidth of the output signal being substantially changed.

2. System according to claim 1, wherein the modulator unit modulates the output signal to be transmitted, or a carrier signal of transmitting means in the transmitter, or the output signal at any site along the transmission circuit, independently of a transmission cycle.

3. System according to claim 1, wherein a controller serves to control the modulator unit.

4. System according to claim 1, wherein the transmitter comprises a clock generator.

5. System according to claim 4, wherein the modulator unit controls the clock generator appropriately for broadening the spectral lines.

6. System according to claim 5, wherein the modulator unit subjects a cycle frequency of the clock generator to frequency modulation.

7. System according to claim 6, wherein the clock generator comprises a VCO as a frequency-determining element.

8. System according to claim 7, wherein the control unit adjusts the VCO.

9. System according to claim 1, wherein the modulator unit subjects the signal to be transmitted to frequency, phase or amplitude modulation.

10. System according to claim 1, wherein the modulator unit subjects the carrier signal of the transmitting means in the transmitter or the transmitter output signal at substantially any site along the transmission circuit to frequency or phase modulation, independently of a modulation technique selected for the purpose of signal transmission.

11. System according to claim 1, wherein the carrier signal or the transmitter output signal is pulsed, and the modulator unit shifts or delays individual signal edges towards earlier or later points of time in proportion to a signal defined by an additionally provided modulation signal generator.

12. System according to claim 11, wherein the modulator unit comprises a delay control means for analyzing the transmitter output signal and for controlling a delay circuit which causes a shift or delay.

13. System according to claim 12, wherein the delay control means comprises a PLL means, and the delay circuit comprises a flip-flop circuit.

14. System according to claim 1, wherein the transmitter comprises a PLL means.

15. System according to claim 14, wherein a variation of modulation by the modulator unit is covered by a control range of the PLL means of the transmitter.

16. System according to claim 1, wherein data coding by means of pseudo random noise is performed in addition to a modulation by the modulator unit.

17. System according to claim 1, wherein a second controller unit is provided in the receiver for controlling the receiver synchronously with the modulation performed by the modulator unit in the transmitter or at substantially any site along transmission circuit, so that the signal received in the receiver is processed as an unmodulated signal, a synchronization between the transmitter, or the transmission circuit, and the receiver being achieved by means of the modulation signal or even another signal jointly available to the transmitter, or the transmission circuit, and the receiver.

18. System according to claim 1, wherein an additional transmission circuit is provided between the transmitter, or the transmission circuit, and the receiver for a transmission of a synchronization signal for controlling a modulation of the transmitter, or the transmission circuit, and the receiver.

19. System according to claim 1, wherein the transmission circuit is selected from the group consisting of a line-bound transmission circuit, a contacting transmission circuit, a contact-free transmission circuit, or combinations thereof.

20. System according to claim 1, wherein the signal comprises a digital signal.

21. System according to claim 1, wherein the transmitter and the receiver are mobile relative to each other.

22. System according to claim 1, wherein the transmitter is a rotating data transmission device.

23. Method for low interference transmission of a signal, comprising the steps of:
generating an output signal to be transmitted with a transmitter at a first location, the signal having substantially a line spectrum;
modulating the signal to be transmitted, or a carrier signal of transmitting means in the transmitter, or an output signal at any site of the transmission circuit with a modulator unit, independently of a modulation technique selected for the purpose of signal transmission, to form a modulated signal;
transmitting the modulated signal from the first location;
receiving the modulated transmitted signal via a transmission circuit at a second location spatially separated from the first location; and
wherein the signal is modulated so that spectral lines of the output signal are broadened to fill gaps between individual spectral lines, and a spectral power density of the generated signal is reduced, without a bandwidth of the generated signal being substantially changed.

24. Method according to claim 23, wherein the spectral power density is reduced by filling gaps between individual spectral lines.

25. Method according to claim 23, wherein the modulator unit is controlled by means of a controller.

26. Method according to claim 23, wherein the transmitter comprises a clock generator.

27. Method according to claim 26, wherein the clock generator is appropriately controlled by means of the modulator unit for broadening the spectral lines.

28. Method according to claim 27, wherein the cycle frequency of the clock generator is frequency modulated by means of the modulator unit.

29. Method according to claim 28, wherein the clock generator comprises a VCO as frequency-determining element.

30. Method according to claim 29, wherein the VCO is adjusted by means of the controller.

31. Method according to claim 23, wherein the modulator unit subjects the signal to be transmitted to frequency, phase or amplitude modulation.

32. Method according to claim 23, wherein the modulator unit subjects the carrier signal of the transmitting means of the transmitter, or the transmitter output signal, at substantially any site along the transmission circuit to frequency or phase modulation, independent of the modulation technique selected for the purpose of signal transmission.

33. Method according to claim 23, wherein the carrier signal or the transmitter output signal is pulsed, and the modulator unit shifts or delays individual signal edges towards earlier or later points of time in proportion to a signal defined by an additionally provided modulation signal generator.

34. Method according to claim 33, wherein the modulator unit comprises a delay control means for analyzing the transmitter output signal and for controlling a delay circuit which causes a shift or delay.

35. Method according to claim 34, wherein the delay control means comprises a PLL means and the delay circuit comprises a flip-flop circuit.

36. Method according to claim 23, wherein the transmitter comprises a PLL means.

37. Method according to claim 36, wherein a variation of modulation by the modulator unit is covered by a control range of the PLL means of the transmitter.

38. Method according to claim 23, wherein data coding is performed by means of pseudo random noise in addition to a modulation by the modulator unit.

39. Method according to claim 23, wherein a second controller unit is provided in the receiver for controlling the receiver synchronously with the modulation performed by the modulator unit in the transmitter or at substantially any site along transmission circuit, so that the signal received in the receiver is processed as an unmodulated signal, a synchronization between the transmitter, or the transmission circuit, and the receiver being achieved by means of the modulation signal or even another signal jointly available to the transmitter, or the transmission circuit, and the receiver.

40. Method according to claim 23, wherein an additional transmission circuit is provided between the transmitter, or the transmission circuit, and the receiver for a transmission of a synchronization signal for controlling a modulation of the transmitter, or the transmission circuit, and the receiver.

41. Method according to claim 23, wherein the transmitter and the receiver are mobile relative to each other.

42. Method according to claim 41, wherein the transmitter is a rotating data transmission device.

43. System for transmitting a digital data signal, comprising:
    a first stationary part;
    a second movable part;
    a transmitter for generating a transmitter output signal that includes a carrier signal and the data signal;
    a receiver for receiving the transmitter output signal;
    a transmission circuit coupling said transmitter to said receiver and for transmitting the transmitter output signal between said first stationary part and said second movable part;
    a modulator coupled to said transmission circuit for generating a modulation signal;
    a controller coupled to and controlling said modulator to generate the modulation signal and to apply the modulation signal at substantially any site in and along the transmission circuit to modulate the transmitter output signal so that a signal spectrum of the transmitter output signal is substantially distributed and a mean spectral power density of the transmitter output signal is reduced; and
    wherein the modulator modulates the transmitter output signal so that spectral lines of the transmitter output signal are broadened to fill gaps between individual spectral lines of the transmitter output signal, and a spectral power density of the transmitter output signal is reduced without a bandwidth of the transmitter output signal being substantially changed.

44. System according to claim 43, wherein the transmission circuit is selected from the group consisting of a line-bound transmission circuit, a contacting transmission circuit, a contact-free transmission circuit, or combinations thereof.

* * * * *